United States Patent [19]

de Almeida Thompson

[11] Patent Number: 5,076,160
[45] Date of Patent: Dec. 31, 1991

[54] FEED DEVICE FOR LOW-DENSITY MATERIALS

[75] Inventor: Eduardo C. de Almeida Thompson, Sao Paulo, Brazil

[73] Assignee: California Pellet Mill Company, San Francisco, Calif.

[21] Appl. No.: 649,327

[22] Filed: Jan. 31, 1990

Related U.S. Application Data

[63] Continuation of Ser. No. 435,614, Nov. 13, 1989, abandoned.

[30] Foreign Application Priority Data

Nov. 14, 1988 [BR] Brazil .............................. PI 8805942

[51] Int. Cl.⁵ .............................................. B30B 3/00
[52] U.S. Cl. ...................................... 100/145; 100/904
[58] Field of Search ................................ 100/145, 904

[56] References Cited

U.S. PATENT DOCUMENTS

| | | | |
|---|---|---|---|
| 1,007,622 | 10/1911 | Würl | 100/904 X |
| 1,534,008 | 4/1925 | Bongardt | 100/145 |
| 2,705,927 | 4/1955 | Graves et al. | 100/904 X |
| 2,803,038 | 8/1957 | Holland et al. | 100/904 X |
| 2,857,624 | 10/1958 | Hanzel et al. | 100/904 X |
| 3,240,169 | 3/1966 | Cunningham | 100/145 |
| 3,812,985 | 5/1974 | Lindeborg et al. | 100/145 |
| 4,186,658 | 2/1980 | Brown | 100/145 X |
| 4,415,336 | 11/1983 | Stogi et al. | 100/145 X |
| 4,567,820 | 2/1986 | Munsell | 100/145 X |

Primary Examiner—Paul T. Sewell
Assistant Examiner—M. D. Patterson
Attorney, Agent, or Firm—Robert F. Palermo

[57] ABSTRACT

A feed device for low-density particulate materials is disclosed for a pelletizing machine. A fin (25) forming a helicoidal spiral on the outer surface of a tubular dome (24) connected to a drive shaft (23) carries the material to one end of the dome, where the volume of air contained in the bulk material is diverted toward the interior of the dome (24) without causing a flow contrary to the displacement of the material, thus eliminating the problem of flow interruptions caused by air entrapment.

4 Claims, 1 Drawing Sheet

FEED DEVICE FOR LOW-DENSITY MATERIALS

This application is a continuation of application Ser. No. 07/435,614, filed Nov. 13, 1989 now abandoned.

BACKGROUND OF THE INVENTION

The present invention pertains to pelletizing machines in general and, more specifically, to a forced feed device for pelletizing machines particularly suitable for feeding low-density materials.

PRIOR ART

Pelletizing or beneficiating processes for materials in particle form by compaction and extrusion are widely known in industry. They are principally used to effect greater durability, to eliminate dust and/or possible losses during handling, and to reduce the storage, packaging, and transport costs by increasing the volumetric density of the materials.

In a pelletizing process the material to be pelletized is typically fed continuously to a pelletization chamber, where it is distributed uniformly on steel rolls which cooperate with the internal surface of a die. The rotation of the die and the rolls forcefully compresses the material, extruding it through the orifices of the die. A number of adjustable knife blades, located near the outer surface of the die, cut the material thus pelletized to the length desired immediately after its extrusion.

It is obvious that numerous parameters have a decisive effect on the quality of the pellets and the capacity of the pelletizing machine. Among those relative to the material, its density, moisture content, particle size, and lubrication characteristics can be mentioned. Among those relative to the characteristics of the pelletizing machine, the ones with a decisive influence are the design of the die, the operating speeds, and especially the maintenance of a uniform flow of material feed.

A constant problem that considerably impairs the maintenance of a uniform feed flow is the low density of certain materials with extremely voluminous particles. For example, while the particulate material for the production of granulated animal feed has a density of the order of 500 kg/m$^3$, materials such as forage in general (alfalfa, corn stalks, and cereal grains), brans (soy, rice, corn, peanuts and others), crushed sugar cane, and agricultural residues can have a low density of the order of 70 kg/m$^3$.

In effect, when these materials are introduced into the worm feeder of the pelletizer together with a volume of air, the air inside the feeder is compressed together with the material being pelletized, which causes an interruption in the flow of material and prevents the maintenance of a constant and uniform feed flow.

SUMMARY OF THE INVENTION

An object of the present invention is to eliminate this shortcoming of the prior art by offering a feed device for a pelletizing machine that furnishes a uniform and constant flow of feed material.

Another object of the present invention is to furnish a feed device that facilitates a uniform and constant feed flow even for voluminous materials of low density.

An additional object of the present invention is to furnish a feed device in which the air flow in countercurrent to the flow of material does not cause an interruption in the flow.

In accordance with the present invention, these objects are achieved through the provision of a feed device, for low-density materials, of the type comprised of a feed screw inside a feed chamber; said device being particularly suitable for use in a pelletizing machine, characterized in that the feed screw consists of a tubular body with at least one screw thread on its external surface and has a provision for venting compressed entrained gases axially through its tubular body.

BRIEF DESCRIPTION OF THE DRAWING

The present invention is described below in greater detail by means of a nonlimiting example, with reference to its implementation illustrated in the attached drawing, the single figure showing a cross-sectional view of a pelletizing machine incorporating the present feed device.

DESCRIPTION OF THE PREFERRED EMBODIMENT

Figure 1:
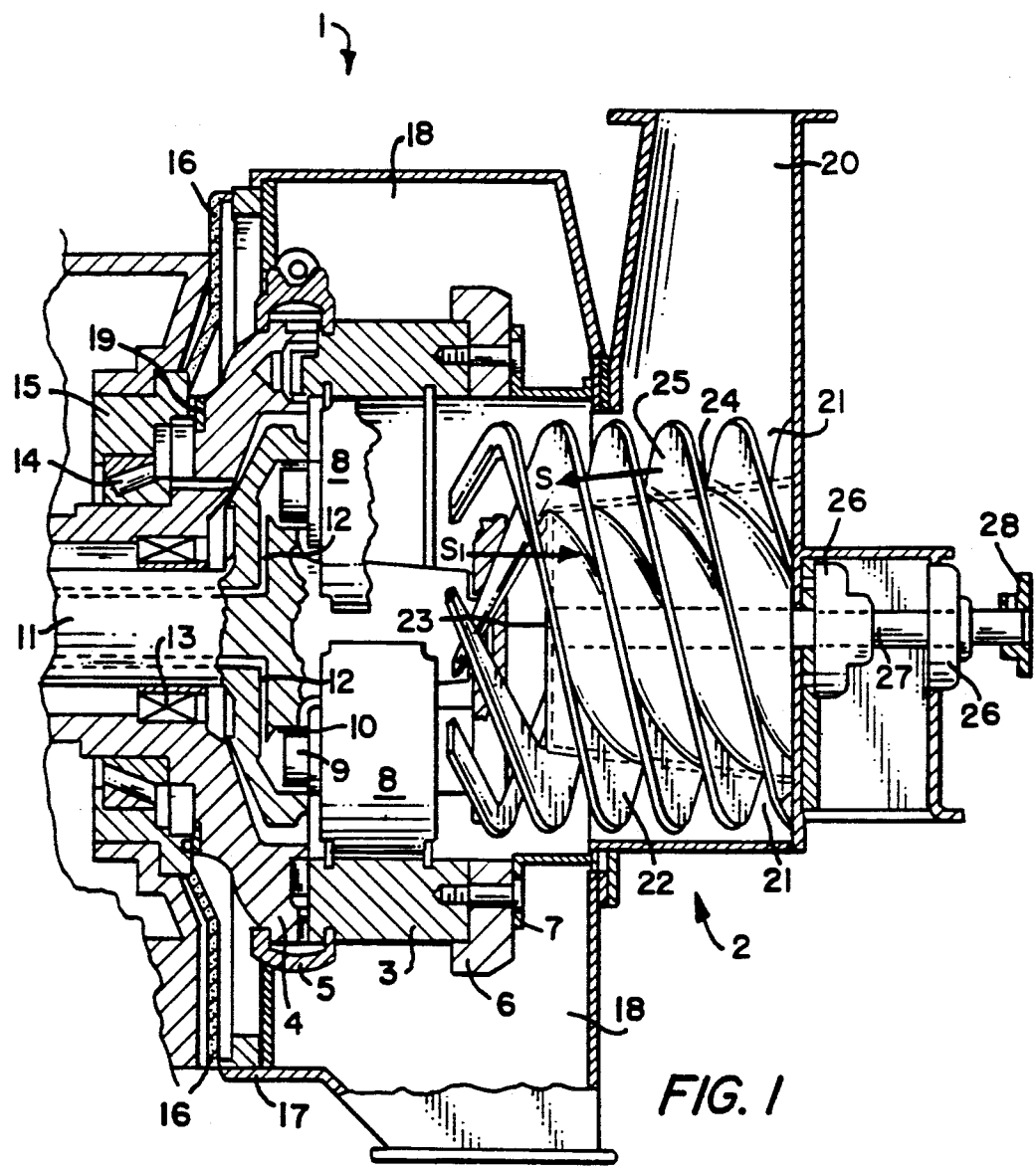

The drawing shows a pelletizing machine 1 incorporating a feed device 2 in accordance with the present invention.

Pelletizing machine 1 consists basically of a rotating die 3 connected to a hollow shaft 4 by means of an elastic clamp 5 and held in position by a reinforcing ring 6 and rotating cones 7.

The interior of the die 3 is provided with two rolls 8, which turn around their own geometric axes, supported in bushings 9 housed in specially formed recesses 10 in main stationary shaft 11 of pelletizer 1. In addition, main shaft 11 is provided with channels 12 for the direct lubrication of bushings 9.

A roller bearing 13 allows hollow shaft 4 and die 3 to rotate relative to stationary main shaft 11, and rolling elements 14 allow die 3 to rotate relative to a support 15, a gasket 16, and outer walls 17 of pelletizing chamber 18. In addition, a protecting ring 19 of suitable material is placed between hollow shaft 4 and support 15 of pelletizer 1.

Feed device 2 in turn consists basically of a descending feed chute 20, the lower end of which opens into a feed chamber 21, inside of which is located a hollow feed screw 22.

Feed screw 22 has a central shaft 23, on which a hollow dome-like element 24 is mounted, on which in turn the feed screw 22 proper in the form of a fin 25 essentially perpendicular to the outer surface of dome 24 is provided, describing a helicoidal spiral thereon.

A pair of complete bearings 26, mounted on an extension 27, permit shaft 23 and consequently screw 22 to rotate when actuated via a gear 28 mounted on the free end of the shaft and driven by an appropriate drive unit.

Feed device 2 in accordance with the present invention operates in a manner similar to the devices of the prior art, except with respect to the flow of particulate material and the flow of air.

Particulate material P to be pelletized drops through chute 20 in a mixture with air and, after reaching feed chamber 21, is forced in the direction indicated by arrows S by fin 25, which rotates integrally with shaft 23. At the end of fin 25, while the material is being subjected to high compression, air is released toward the inside of dome 24 and from there to the atmosphere in the direction of flow indicated by arrows $S_1$.

Feed screw 22, which is open to the atmosphere, is used to allow the air introduced with the low-density particulate material to escape from the die cavity without its compression interfering with the flow of material to be pelletized, thus avoiding any interruption in this flow.

In addition, the escape of air through hollow feed screw 22 permits the maintenance of a constant flow of material feed, thus eliminating the problems resulting from nonuniform feed.

With respect to the description of the invention given above, it must be understood that numerous modifications and variations in its structure will occur to those versed in the technology; these modifications and variations should be considered to be within the spirit and scope of the invention as defined in the following claims.

I claim:

1. A device for feeding low-density gas entraining materials to a processing machine comprising:

a feed chamber;

a feed screw within said feed chamber having first and second ends driven from its first end independently of the processing machine and consisting of a hollow radially symmetrical body with one or more helical fins which extend toward the processing machine beyond the second end of the body and are substantially perpendicular to said body; and means for venting gases from said feed chamber into the second end of said hollow body and out to the atmosphere through said first end, before the material is discharged to the processing machine.

2. The feed device of claim 1, wherein the means for venting gases comprises an open end on the hollow body on the second end of the feed screw.

3. In combination with a machine for processing low density gas entraining materials and an elongate feed chamber therefor, a feed screw comprising:

a hollow radially symmetrical body having first and second ends and one or more helical fins extending along the exterior surface of said body from said first end to a point beyond said second end;

means at said first end for rotatively driving said body and for thereby feeding said low density materials beyond said second end into said processing machine; and means for removing the entrained gases from the low density materials and for expelling said gases through said first end of said body.

4. The feed screw of claim 3, wherein the means for removing the entrained gases from the low density materials comprises a spacious opening into said hollow body at said second and a vent opening to the atmosphere outside the feed chamber at said first end.

* * * * *